United States Patent
Geiβel et al.

(10) Patent No.: US 11,448,116 B2
(45) Date of Patent: Sep. 20, 2022

(54) MULTIPORT VALVE, FLUID CIRCUIT AND COOLING FLUID CIRCUIT

(71) Applicant: WOCO Industrietechnik GmbH, Bad Soden-Salmünster (DE)

(72) Inventors: Eberhard Geiβel, Künzell (DE); Torsten Hofmann, Bad Soden-Salmünster (DE); Martin Heldmann, Schlüchtern (DE)

(73) Assignee: WOCO Industrietechnik GmbH, Bad Soden-Salmuenster (DE)

( * ) Notice: Subject to any disclaimer, the term of this patent is extended or adjusted under 35 U.S.C. 154(b) by 0 days.

(21) Appl. No.: 17/078,482

(22) Filed: Oct. 23, 2020

(65) Prior Publication Data

US 2021/0123374 A1    Apr. 29, 2021

(30) Foreign Application Priority Data

Oct. 25, 2019   (DE) .......................... 102019128897.5

(51) Int. Cl.
| | |
|---|---|
| *F01P 7/14* | (2006.01) |
| *F16K 11/076* | (2006.01) |
| *F16K 11/02* | (2006.01) |
| *F16K 11/07* | (2006.01) |
| *H02K 9/193* | (2006.01) |

(52) U.S. Cl.
CPC ................ *F01P 7/14* (2013.01); *F16K 11/02* (2013.01); *F16K 11/076* (2013.01); *H02K 9/193* (2013.01); *F01P 2007/146* (2013.01)

(58) Field of Classification Search
CPC ..... F01P 7/14; F01P 2007/146; F16K 11/076; F16K 11/072; F16K 11/02; F16K 11/00; H02K 9/193
See application file for complete search history.

(56) References Cited

U.S. PATENT DOCUMENTS

| | | | |
|---|---|---|---|
| 2014/0083376 A1* | 3/2014 | Bohm ..................... | F01P 7/165 123/41.1 |
| 2016/0017820 A1* | 1/2016 | Arai ....................... | F02M 19/06 123/438 |

FOREIGN PATENT DOCUMENTS

| | | |
|---|---|---|
| DE | 91 05 909.7 U1 | 7/1992 |
| DE | 10 014 555 A1 | 10/2001 |
| DE | 10 100 34 403 A1 | 1/2002 |
| DE | 103 45 614 A1 | 5/2005 |
| DE | 10 2007 003 690 A1 | 8/2008 |
| DE | 10 2007 035 969 A1 | 2/2009 |

OTHER PUBLICATIONS

Office Action dated Sep. 18, 2020 for German Patent Application No. 10 2019 128 897.5 (German language only) (10 pp.).

* cited by examiner

*Primary Examiner* — Jacob M Amick
(74) *Attorney, Agent, or Firm* — Banner & Witcoff Ltd.

(57) ABSTRACT

A multiport valve for controlling a fluid flow in a fluid circuit, such as a cooling fluid circuit of a motor vehicle, may include a valve housing having at least three fluid connections and a rotary slide for setting the fluid flow. The rotary slide includes at least two fluid channels and is configured to connect two respective fluid connections fluidly via one fluid channel dependent upon its rotary position in relation to its rotational axis. The at least three fluid connections and the at least two fluid channels overlap in relation to a crosswise direction oriented crosswise relative to the rotational axis.

20 Claims, 4 Drawing Sheets

MULTIPORT VALVE, FLUID CIRCUIT AND COOLING FLUID CIRCUIT

PRIORITY

This application claims the benefit and priority of German Patent Application DE 10 2019 128 897.5, filed Oct. 25, 2019, which is incorporated by reference herein in its entirety.

TECHNICAL FIELD

The present embodiments relate to a multiport valve for controlling a fluid flow in a fluid circuit, in particular a cooling fluid circuit, in particular of a motor vehicle. Furthermore, the present embodiments provide a fluid circuit, in particular a cooling fluid circuit, of a motor vehicle with such a multiport valve.

BACKGROUND

Valves of the multiport valve class, which for example are employed in a cooling medium circuit of a motor vehicle, comprise a housing with conduit connections for guiding media and at least one valve member which may for example be a rotary slide, for distributing the media to the different conduit connections. Especially in the area of the increasingly important electro mobility, the guiding of fluids, particularly cooling fluid, becomes ever more decisive and a controlling of the individual fluid flows with low-loss or loss-less in regard to the flow becomes ever more important.

SUMMARY

A control device for the cooling circuit of a combustion machine having two partial cooling water flows is known from DE 10 014 555 A1. The multiport valve comprises a housing limiting a cylindrical chamber in which a valve member formed as a barrel drum is arranged. Two entry conduits and one discharge conduit are formed in the housing. By rotation of the barrel drum, different throughflow scenarios are attainable in which fluidly connectable crossbores introduced into the barrel drum fluidly connect the openings with one another. The individual bores are sectionally separated from each other by a central guiding element. However, the guiding element does not extend completely radially trough the valve member so that the bores flow into each other in the area of the cross section of the valve member. This causes the individual partial fluid flows to blend, which, firstly, is not always desired, and, secondly leads to loss of flow. The valve member according to DE 10 014 555 A1 is incapable of close one of the entry openings while the other entry opening is opened and connected to the discharge opening.

It is an objective of the present embodiments to overcome the disadvantages of the prior art, in particular to provide a multiport valve with lesser loss of flow, in which it is in particular possible to control partial fluid streams in a more precise manner.

In accordance with one aspect of the present embodiments, a multiport valve for controlling a fluid flow in a fluid circuit, in particular a cooling fluid circuit, of a motor vehicle, is provided. A cooling fluid circuit can for example be formed between a motor, in particular a combustion motor or an electric motor, and a cooler of a motor vehicle. When using the multiport valve in a cooling circuit, the multiport valve can generally serve to increase the motor efficiency, in particular during its cold start phasis and/or during short drives. The multiport valve can for example control the throughflow of the fluid stream dependent upon a fluid temperature and/or an ambient temperature in order to control a predefined fluid temperature, in particular to hold a certain level. For example, the cooling circuit may comprise a main channel in which the cooler for chilling the cooling fluid coming from the motor, and a bypass channel for circumventing the cooler. For example, the bypass channel can be configured such that the cooling fluid can return to the motor without an influence, in particular unchilled, by the cooler. The multiport valve is for example configured to return cooling fluid coming from the engine without being chilled by the cooler to the motor during a cold start phasis, a heating up phasis or a warming up phasis of the motor, so as to accelerate heating up the motor. When the motor is increasingly heated up, particularly during full-load operation, the multiport valve is set such that warmed cooling fluid coming from the motor is introduced into the cooler integrated in the cooling fluid circuit before it is once more led back to the motor. This realises cooling the motor and particularly avoids overheating the motor.

The multiport valve comprises a valve housing for example of metal or plastic which may for example be manufactured by means of a plastic injection moulding process. The valve housing comprises at least three fluid connections. Via the fluid connections, fluid flow can enter into the valve housing or exit out of the valve housing. The multiport valve is realised for example as a 3/2-way-valve. This means that the 3/2-way-valve has three fluid connections, in particular two fluid exits and one fluid entry, and two operating positions, in particular control states. In the different operating positions, different throughflow scenarios can be realised, wherein two respective fluid connections forming a pair are brought into fluid connection with one another. One of the at least three fluid connections can be a motor fluid entry for receiving cooling fluid coming from the motor. The motor fluid entry is configured to be connected to the motor in order to introduce the cooling fluid via the motor fluid entry into the valve housing of the multiport valve. A further fluid entry can be formed as a motor fluid exit for discharging fluid towards the motor. Thus, the motor fluid exit can be fluidly connected with the motor as well in order to lead fluid out of the valve housing through the motor fluid exit back to the motor. The valve housing can be formed as an essentially rigid structure and include interfaces for attachment to a further motor-vehicle-stationary component and/or for fastening the multiport valve to the vehicle chassis or to the motor.

The multiport valve in accordance with the embodiments furthermore comprises a rotary slider for setting the fluid flow in particular in relation to the at least three fluid connections, the rotary slide being arranged inside the valve housing, in particular in an interior housing space limited or defined by the valve housing. The rotary slide can also be formed as an essentially rigid structure and/or be made of plastic or metal. For example, the rotary slider is manufactured through a plastic injection moulding process. The rotary slide comprises at least two fluid channels and is configured to fluidly connect two respective fluid connections via one respective fluid channel dependent upon its rotational position in relation to its rotational axis. For example, the valve housing and the rotary slide are rotational components in regard to the rotational axis. By rotating the rotary slide around the rotational axis, the fluid flow through the multiport valve, in particular through the valve housing and through the rotary slide, is set. The at least three fluid connections and the at least two fluid channels overlap each other in relation to a crosswise direction, in particular a radial direction, across from the rotational axis. For example, the at least three fluid connections and the at least two fluid channels lie in the same plane with regard to the rotational axis. In particular losses of the flow can be avoided or reduced in this manner. This has to do with reducing or avoiding any deflections of the fluid flow for the most part.

According to the embodiments, the multiport valve comprises a first control state in which the rotary slide is oriented in relation to the valve housing such that a first fluid channel connects a first pair of fluid connections fluidly with one another and such that a fluid flow through the at least one further fluid channel is prevented. In different words, the at least one further fluid channel is switched blind in the first control state. This means that the fluid flow coming into the multiport valve flows essentially exclusively through the first fluid channel and thus no fluid flow can come into the at least one further fluid channel. Furthermore, the multiport valve comprises at least one other control state in which a fluid flow through the first fluid channel is prevented and at least one further fluid channel connects a further pair of fluid connections fluidly with one another. This means that in the at least one further control state, the first fluid channel is switched blind such that no fluid flow comes through it. The fluid flow in the at least one further control state streams essentially exclusively through the at least one further fluid channel. Thereby it is possible to realise at least two control states with a low-loss of flow. Furthermore, the multiport valve according to the embodiments allows to guide a fluid flow precisely and reliably without incurring flow losses in regard to pressure and/or volume. When employing the multiport valve in a cooling fluid circuit it is for example possible to precisely introduce the entirety of the cooling fluid coming from the motor either exclusively to the cooler for chilling or exclusively for accelerating the heating phasis of the motor back to the same. Thereby it is possible on the one hand to shorten the heating up or warming up phasis of the motor and on the other hand to improve the cooling efficiency of the motor.

In one of the present embodiments, at least one fluid connection is formed as a fluid entry for introducing fluid into the valve housing and at least one fluid connection is formed as a fluid exit for discharging a fluid out of the valve housing, wherein the at least one further fluid connection is formed as a fluid entry or as a fluid exit. This means for example that in the first control state, in which the rotary slide takes a first rotational position regarding the valve housing, the one fluid entry is connected fluidly through a fluid channel to one of the two fluid exits so as to allow for a fluid flow. In the first control state the at least one further fluid channel and the further fluid exit is thus switched blind such that no fluid flow flows through the at least one further fluid channel or the further fluid exit. Furthermore it can be provided that in the at least one further control state, in which the rotary slide is oriented in a further rotational position regarding the valve housing, the one fluid entry is connected fluidly through the further fluid channel with the further fluid exit to realise fluid flow. In this further control state, the first fluid channel and the first fluid exit is then switched blind so that no fluid flow occurs herein. According to a further embodiment of the multiport valve, each fluid channel is associated with exactly one pair of fluid connections. In particular, each fluid channel is associated with exactly one pair of fluid connections such that each fluid channel connects exactly one pair of fluid connections fluidly with one another in exactly one rotational position of the rotary slide, so as to enable a fluid flow between the pair of fluid connections and to prevent any fluid flow through the further fluid channel. In case of two fluid channels and three fluid connections, that is, a first, a second, and a third fluid connection, this means that the first fluid channel is associated with exactly one pair of fluid connections, namely for example the pair of the first and of the second fluid connection, and the second fluid channel is associated to another pair of a fluid connections, namely in this case for example the pair of the first and the third fluid connection. In particular through the unique association of fluid channel and the pair of fluid connections it is possible to design and/or dimension the fluid connections and/or the fluid channels, each, with respect to a flow efficiency or avoiding flow losses with regard to pressure and/or volume. Each fluid channel can for example be optimally adapted to the corresponding form and/or position of the fluid connections formed in the fluid housing.

According to a further development of the multiport valve, the at least two fluid channels are independent from one another, in particular fluidly separated from one another. In other words, in the area of the rotary slide, no fluid exchange between the at least two fluid channels occurs. In particular, the fluid channels each flow into the pair of fluid connections associated with the corresponding fluid channel. Furthermore it can be provided that two respective adjacent fluid channels are separated by a separation wall oriented across with regard to the rotational axis of the rotary slide. The separation wall can thereby be associated to one fluid channel on one side across relative to the rotational direction and to a further fluid channel on the other, opposite side across with regard to the rotational direction, or form a fluid channel limiting wall. In this case, the separation ensures that no fluid exchange occurs between the fluid channels.

According to a further embodiment of the multiport valve, an axial extension along the rotational axis of the rotary slide of the fluid connections and/or of the fluid channels realises at least 50% of a total axial extension of the rotary slide. The total axial extension of the rotary slide may be understood as being the total axial extension or axial dimension formed by the part of the rotary slide forming the valve member. A valve member may be understood as being that part of the rotary slide which cooperates with the valve housing, particularly a valve seat arranged in the valve housing, and for controlling the fluid flow. For example it can be provided that additional components, such as actuator components and/or fastening structures extend over the axial extension of the valve member of the rotary slide. For example, the axial extension of the fluid connection and/or of the fluid channels is at least 60%, at least 70%, at least 80% or at least 90% of the total axial extension of the rotary slide or particularly the valve member of the rotary slide.

In a further exemplary embodiment, the valve housing comprises a rotationally shaped valve seat in regard to which the rotational rotary slide is rotatably mounted and/or with whom the rotary slide cooperates for setting the fluid flow. According to an exemplary further embodiment, the valve housing forms the valve seat. The valve seat is then formed in one piece together with the valve housing. According to an exemplary further embodiment, the valve seat, which for example is formed as an annular valve seat, lies or is crosswise in regard to the rotational direction between the rotary slide and the valve housing. For example, the valve seat is fixed, in particular welded and/or flange-mounted, to the valve housing in a torque-proof manner.

According to a further embodiment of the multiport valve, at least one fluid channel is formed as a thoroughfare channel, in particular formed as a throughbore. The thoroughfare fluid channel connects two fluid connection openings at the outer circumference of the rotary slide with one another. For example, the fluid thoroughfare channel has a constant throughflow cross section, wherein in particular the throughflow cross section of the fluid thoroughfare channel corresponds to the throughflow cross section of the fluid connection openings. According to the embodiments it was shown that thereby loss of flow can be significantly reduced or minimised.

According to a further development of the present embodiments, at least one further fluid channel has a changing throughflow cross section according to a rotationally shaped outer contour of the rotary slide. This can be realised by the further fluid channel comprising one fluid channel limiting wall being formed corresponding to a rotationally shaped outer contour of the rotary slide, in particular being rotationally curved. In particular, the at least one further fluid channel can be continuously outwardly open. This means that the fluid channel is not completely circumferentially closed, in particular limited by a corresponding fluid channel limiting wall of the rotary slide. For example, the at least one further fluid channel is realised as a recess or pocket brought into the solid material of the rotary slide from the outside. Thereby it can be provided that the valve seat and/or the valve housing limited the at least one further fluid channel for defining the throughflow cross section. Furthermore, it is possible that the at least one further fluid channel is at least sectionally limited in the circumferential direction towards the outside through a housing wall.

In an embodiment of the multiport valve, the rotary slide performs a rotational movement of less than 90°, or in particular less than 60°, such as 45°, with regard to the rotational axis, when switching between the first control state and the at least one further control state. Thereby it becomes possible to reduce the switching duration between the different control states. Alternatively, it is possible to use a more cost efficient and/or less powerful rotary actuator for the rotary slide at the same switching duration because a reduced switching velocity is necessary. In particular, a rotational movement of 45° with regard to the rotational axis is necessary so that, in comparison to known multiport valves, for which a rotational movement of 90° is necessary to take different control states, to reduce the switching duration by 50% and/or to reduce the switching velocity by 50% so that significant cost savings can be realised. For example, the 45°-switch-rotational movement shall be realised when the fluid connections are arranged offset by 90° in relation to the rotational axis of the rotary slide. The angle spanned by two adjacent fluid connections in relation to the rotational axis of the rotary slide can be called the angular pitch. Thereby it can be provided that the angle of the switching-rotational movement between the control states amounts to one half of the angular pitch. Furthermore it can be provided that a deflection angle of a fluid channel, that is the angle by which the corresponding fluid channel and the fluid flow within the rotary slide are deflected, correspond to the angular pitch.

According to a further development of the multiport valve according to the embodiments, a fluid channel of the rotary slider is configured such that the fluid flow is deflected by 90°. In particular, the at least one further fluid channel, which is active in at least one further control state, is configured accordingly. For example it can be provided that the respective outwardly continuously open at least one further fluid channel and the fluid connection side, in particular fluid connection opening side in the area of the rotary slide may have a concavely curved inner contour. Through the concavely curved inner contour, flow losses can be minimised or reduced. In particular, when guiding fluid flow into or out of the rotary slide through fluid connections or fluid connection openings, the entering fluid flow as well as the exiting fluid flow experiences a continuous, small deflection so that dynamic pressure and corresponding losses of flow are avoided. In so far, additionally no dead volume can form in which the flow essentially completely loses the velocity or a fluid pressure.

In a further embodiment of the multiport valve, a pair of fluid connections is oriented aligned with regard to one another and/or one fluid channel is designed such that, when guiding and/or leading the fluid flow from one fluid connection to a further fluid connection, the fluid flow experiences no deflection. In this control state, essentially no flow losses occur. According to an exemplary further development, the rotary slider has one rotary position in which one pair of fluid connections and the fluid channel associated with this pair are oriented aligned with one another. In so far, the fluid flow can flow through the entire multiport valve, that is: through the valve housing and through the rotary slide, essentially completely without flow obstacles and/or deflection.

In a further embodiment of the multiport valve, a throughflow cross section of the fluid connections corresponds to a throughflow cross section of at least one of the fluid channels and/or of throughflow cross section of one pair of fluid connection openings of a fluid channel in the rotary slide. By providing equal throughflow cross sections, losses of flow are further avoided or reduced. In particular, no obstacles such as baffles and/or undercuts forming a dead volume are formed.

In a further embodiment of an multiport vale, the fluid channels are configured such that and/or the fluid channels are matched with a pair of fluid connection associated with the one fluid channel, in particular form-matched, such that the fluid flow can pass the pair of a fluid connections and the associated fluid channel free of flow obstacles, in particular free of edges, free of protrusions and/or free of dead volume. Through the corresponding configuration or through matching to one another, losses of flow can furthermore be avoided. In particular, flow swirls can be avoided. In particular flow swirls are avoided which may occur at edges, protrusions and/or undercuts in the course of the fluid flow.

According to a further aspect of the present embodiments, which may be combined with the previous aspect and exemplary embodiments, a fluid circuit, in particular a cooling fluid circuit, of a motor vehicle is provided. The fluid circuit comprises a multiport valve in accordance with the previously described aspects or embodiments. Furthermore, the fluid circuit comprises a fluid carrying fluid guiding structure attached to the multiport valve for introducing fluid flow into the multiport valve and/or for discharging fluid flow out of the multiport valve.

The present embodiments furthermore provides a cooling fluid circuit for introducing or discharging a cooling fluid into or out of a motor, in particular a combustion motor or an electric motor, of a motor vehicle. The cooling fluid circuit according to the invention comprises a main channel connecting a motor fluid entry and a motor fluid exit, in which main channel a cooler is integrated and through which chilled cooling fluid can be provided to the motor. During operation of the motor the same may attend to strongly heat up. For this reason chilled cooling fluid can be introduced into the motor for avoiding overheating and/or for increasing motor efficiency.

Furthermore, the cooling fluid circuit comprises a bypass channel for circumventing the cooler. By means of the bypass channel, warmed cooling fluid leaving the motor can be returned to the motor without being influenced by the cooler, in particular without being chilled. This may be necessary during a cold-start phasis, a warming up phasis or start-up phasis and/or during short drives so as to accelerate heating up the motor and/or so as to increase the motor efficiency.

Furthermore, the cooling fluid circuit comprises a multiport vale, in particular a three/two-way valve, for controlling cooling fluid flow in the cooling fluid circuit particularly between the motor, in particular combustion engine or electric engine, and the cooler of a motor vehicle. The multiport valve can for example be configured according to one of the previously described aspects or embodiments. The multiport valve has a first control state configured as a cooling position, in which the motor is provided with the chilled cooling fluid from the cooler through the main channel and in which a cooling fluid flow through the bypass channel is prevented; and a further control state formed as a bypass position, in which the motor is provided with unchilled cooling fluid through the bypass channel and in which a cooling fluid flow through the main channel is prevented. Thereby it is possible to realise at least two control states and the cooling fluid circuit with a low flow loss. Furthermore, the cooling fluid circuit according to the embodiments enables a precise and reliable guiding of a fluid flow without flow losses in regard to pressure and/or volume occurring. In the cooling fluid circuit it is for example possible to precisely guide the entirety of the cooling fluid coming from the motor either exclusively to the cooler for chilling or exclusively for accelerating the heating-up-phasis of the motor back to the same. Thereby on the one hand the heating-up phasis or starting phasis of the motor can be shortened and on the other hand the cooling efficiency of the motor can be improved.

BRIEF DESCRIPTION OF THE DRAWINGS

In the following, further features, characteristics and advantages of the embodiments are apparent through the description of embodiments according to the enclosed exemplary figures, in which is shown.

BRIEF DESCRIPTION OF THE DRAWINGS

Figure 7:
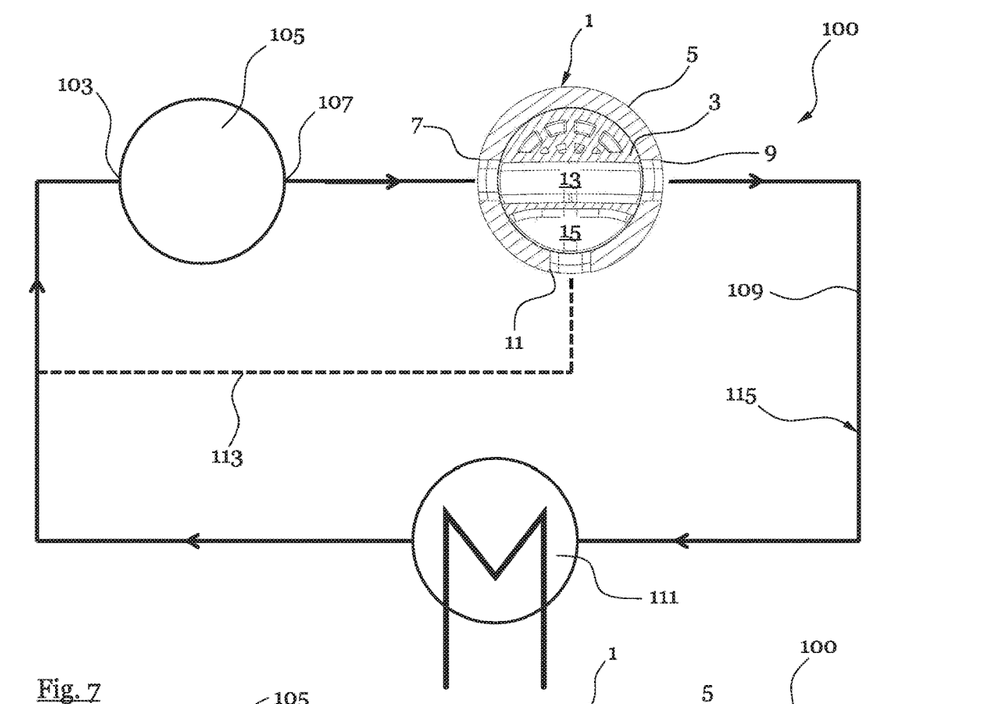
FIG. 7 is a schematic sketch regarding the assembly situation of a multiport valve according to an embodiment of a fluid circuit, wherein the multiport valve is in a first control state.
Figure 8:
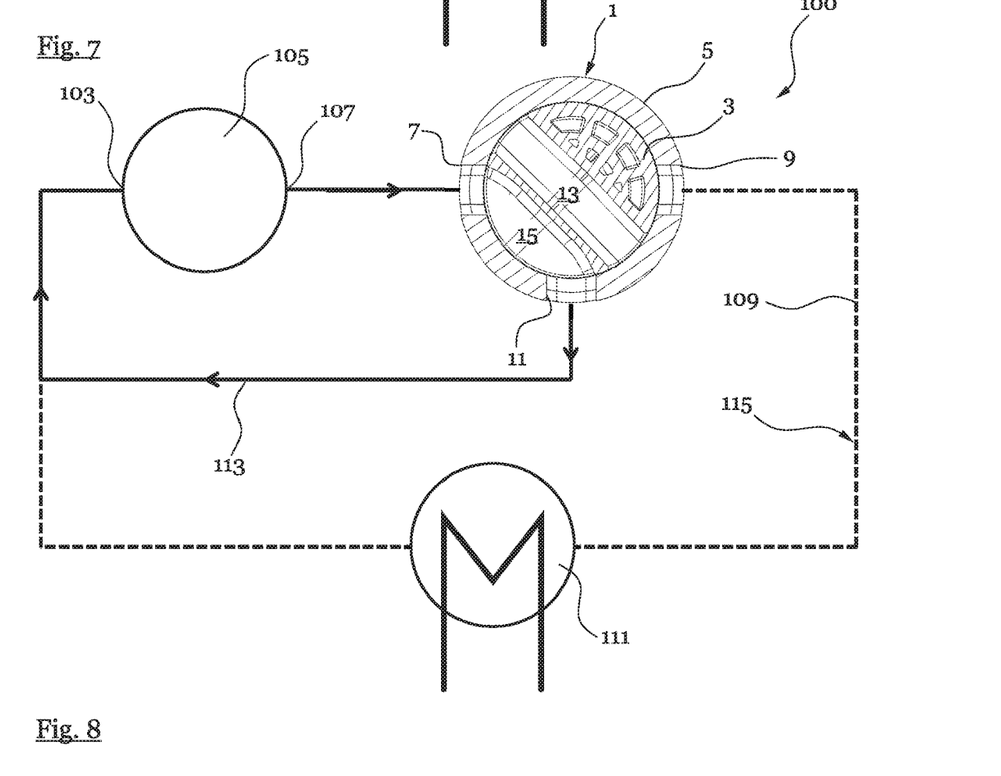
FIG. 8 is a further schematic sketch according to FIG. 7, wherein the multiport valve is in a third control state.

In the following description of exemplary embodiments of multiport valves according to the embodiments and of fluid circuits according to the embodiments, a multiport valve according to the embodiments is generally designated with reference numeral 1 and a fluid circuit in accordance with the embodiments is generally designated with reference numeral 100. The multiport valves 1 shown in the exemplary embodiments according to FIGS. 1 through 8 serve to control a fluid flow in a fluid circuit 100 which may for example be a cooling means circuit of a motor vehicle. For example, the multiport valve 1 is made of plastic through a plastic injection moulding process. Alternatively it is conceivable that the multiport valve 1 is produced in accordance with known manufacturing processes for example from metal. Referring to the exemplary embodiments according to FIGS. 1 through 6, multiport valves 1 according to the embodiments are shown. Referring to FIGS. 7 and 8, exemplary embodiments of fluid circuits 100 according to the embodiments are schematically illustrated.

Multiport valves 1 according to the embodiments comprise the following mean constituents: a valve housing 5; and a rotary slide 3 arranged and rotably mounted within the valve housing 5 for setting the fluid flow. The exemplary embodiments shown in the figures illustrate as an example a 3/2-way-valve, wherein the number 3 defines the number of fluid connections and number 2 defines the number of switch positions or control states. The valve housing 5 comprises at least 3 fluid connections 7, 9, 11 which will be covered in further detail in regard to FIG. 3, ff. The rotary slide 3 comprises at least 2 fluid channels 13, 15 and is configured to connect two fluid connections 7 and 9 or 7 and 11 fluidly through the fluid channel 13 or 15 dependent on its rotary position regarding its rotational axis R, where independent upon the rotary position of the rotary slide 3, different control states of the multiport valve 1 can be taken to enable different throughflow scenarios and to guide or deflect the fluid flow within the fluid circuit 100 as desired.

Figure 1:
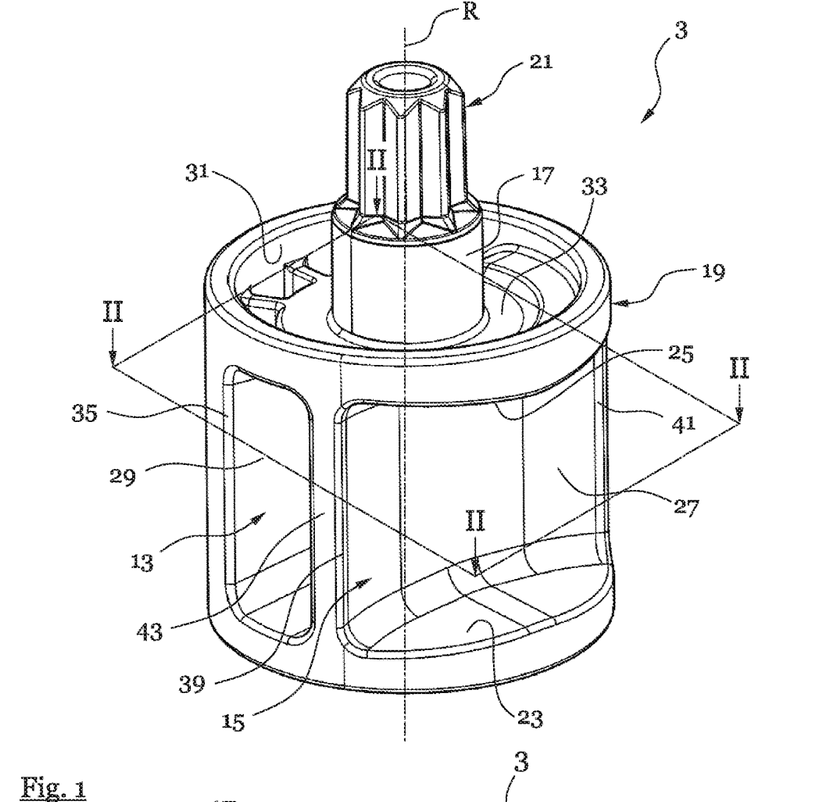
FIG. 1 is a perspective view of an exemplary embodiment of a rotary slide of a multiport valve according to an embodiment.

In FIG. 1, an exemplary embodiment of a rotary slide 3 of a multiport valve 1 according to an embodiment is shown in a perspective view. The rotary slide 3 is designed as a rotationally shaped component with regard to the rotational axis R and comprises an essentially cylindrical basic structure 19. Arranged concentrically with regard to the rotational axis R and thus in the centre of the rotary slide 3, an essentially cylindrical carrier shaft 17 is provided which is coupled to a control actuator for setting the multiport valve 1 which is not shown in further detail. The carrier shaft 17, which is attached torque-proof to the valve member 19 which forms the essentially cylindrical basic structure of the rotary slide 3, comprises on one end of the carrier shaft 17 a projection-recess structure 21 for transferring forces between the actuator and the rotary slide 3 that is for setting the rotary slide 3, which may for example be a sprocket 21. The rotary slide 3 comprises two fluid channels 13, 15 through which the fluid flow can move through the rotary slide 3. As can be seen in FIG. 1, the fluid channels 13, 15 are formed in the cylindrical basic structure or valve member 19. An axial extension of the fluid connections 13, 15 along the rotary axis R of the rotary slide 3 is essentially equally large and amounts to at least 50% of a total axial extension of the cylindrical basic structure 19 of the rotary slide: in FIG. 1 approximately 80%.

The fluid channel 13, which is formed as a thoroughfare channel through the rotary slide 3, comprises an essentially rectangular cross section which is essentially constant along the longitudinal extension of the fluid channel 13. The fluid channel 13 thus has a constant throughflow cross section for the fluid flow. The fluid channel 15 is arranged along an outer circumference of the rotary slide 3 or of the cylindrical basic structure 19 and outwardly open. Thereby, the fluid channel 15 has a changing throughflow cross section according to the rotational outer contour of the rotary slide 3 or cylindrical basic structure 19. Therefore, the fluid channel 15 or its throughflow cross section within the fluid channel 15 is limited by the rotary slide 3 through plane basis surfaces 23, 25 which are essentially parallel to one another and face in the rotary direction R which limit the fluid channel 15 in the direction of the rotational axis R, and form or limit an inner axial wall limiting the fluid channel 15 crosswise in regard to the rotational axis direction R. In the area of the outer circumference of the rotary slide 3, no limiting wall is provided for the fluid channel 15 so that it is outwardly open. In contrast, the fluid channel 13 comprises a circumferentially limiting fluid channel wall 29.

Furthermore, it is shown in FIG. 1 that the rotary slide 3 has an annular edge 31 axially protruding over the basic surface 33 of the rotary slide 3 in the direction of the rotational axis R, which annular edge 31 surrounds the carrier shaft 17 in a distance.

At the cylindrical outer circumference of the rotary slide 3 or the cylindrical basic structure 19, the fluid channels 13, 15 each flow into two respective fluid connection openings 35, 37 or 39, 41 formed on the outside. The respective fluid connection openings 35, 37, 39, 41 are thereby formed or dimensioned such that the fluid flow entering or exiting through the fluid connection openings 35 through 41 can come into or out of the corresponding fluid channel 13, 15 essentially without flow obstacles, that is free of edges, free of protrusions and/or free of dead volume. It is further shown in FIG. 1 that the two fluid channels 13, 15 are independent from one another or in other words fluidly separated from one another. According to the embodiment in FIG. 1, this is realized by a separation wall 43, which is oriented crosswise in relation to the rotational axis R, separating the fluid channels 13, 15 structurally from one another, in particular hermetically sealing them from one another. Thereby, one side of the separation wall 3 facing the fluid channel 15 forms the axial inner wall 27 which limits the fluid channel 15 in the direction crosswise to the rotational axis R, and a side of the separation wall 43 opposite to the inner axial wall 27 forms a section of the fluid channel wall 29 which limits the fluid channel 13 crosswise in regard to the rotational axis R.

Figure 2:
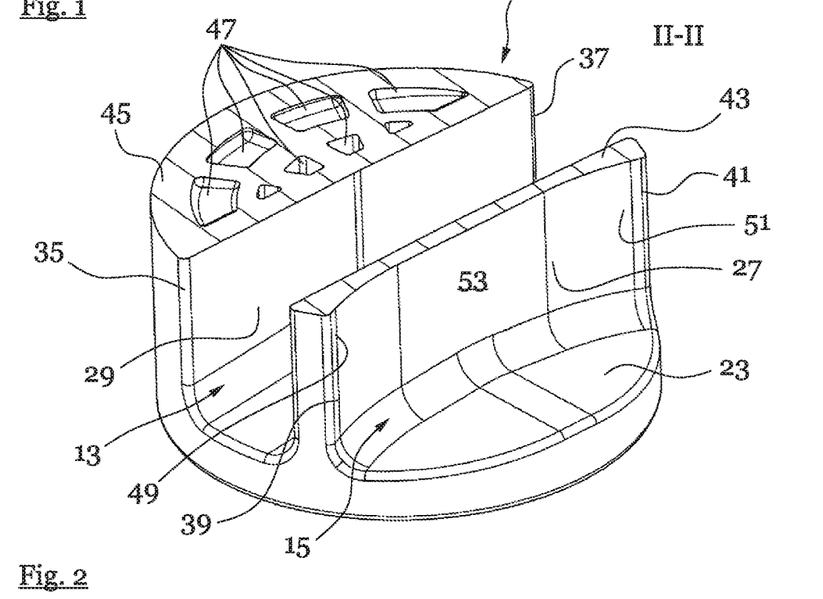
FIG. 2 is a cross-sectional view of the rotary slide according to FIG. 1 in accordance with plane II.

In FIG. 2 a perspective cross-sectional view according to plane II of FIG. 1 is formed, wherein the rotary slide 3 is cut essentially and one half of the axial height with regard to the rotational axis R. It is particularly shown in FIG. 2 that the separation wall 43 extends completely through the rotary slide 3 so that fluid channels 13, 15 are completely fluidly and structurally separated from one another. In other words, the fluid channels 13, 15 in the area of the rotary slide 3 do not flow into one another. This means that no fluid exchange between the fluid flow of the fluid channel 13 and the fluid flow of the fluid channel 15 may occur. On an opposite side across from the rotational axis R of the fluid channels 15, the rotary slide 3 or the cylindrical basic structure 19 is essentially formed of solid material and forms a partially cylindrical exterior wall section 45. The exterior wall section 45 which essentially consists of solid material comprises several hollow spaces 47 extending in the radial direction R through the rotary slide 3, the cross section of which is different and adapted to the rotary shape of the rotary slide 3. Inner hollow spaces 47, that is hollow spaces 47 arranged closer to the rotational axis R, thereby comprises more cross section than outer hollow spaces 47. The hollow spaces 47 contribute to the weight reduction.

In FIG. 2 it is further shown that the separation wall 43, in particular the axial inner wall 27 of fluid channel 15 in the area of the fluid connection openings 39, 49 is slightly concavely curved. The curved wall sections 49, 51 resulting thereby, flow as a single piece into a connection wall section 53 in which the separation wall 43 has a constant cross section.

Figure 3:
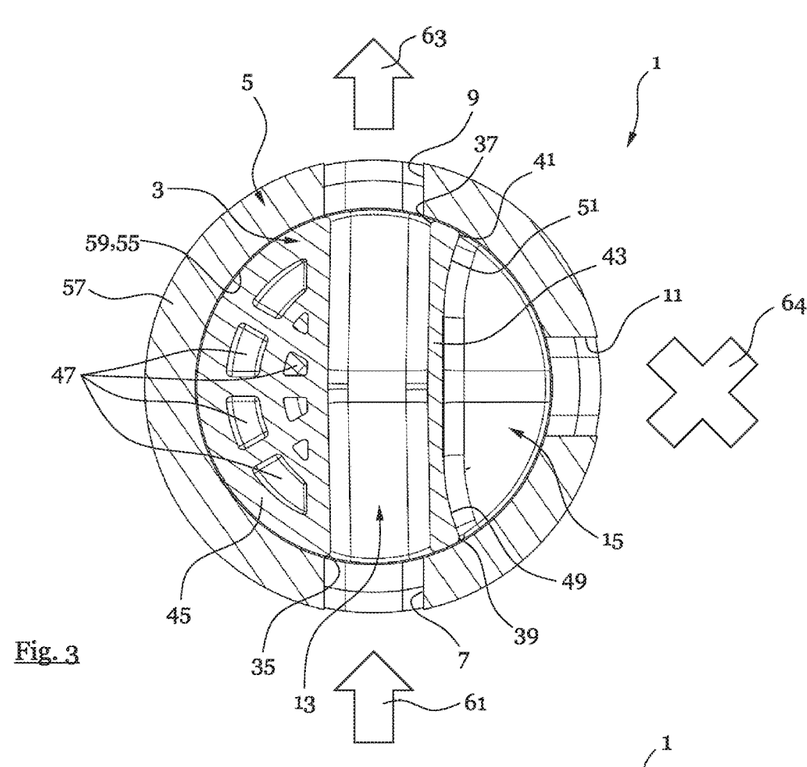
FIG. 3 is a cross-sectional view of a multiport valve according to an embodiment in a first control state.
Figure 4:
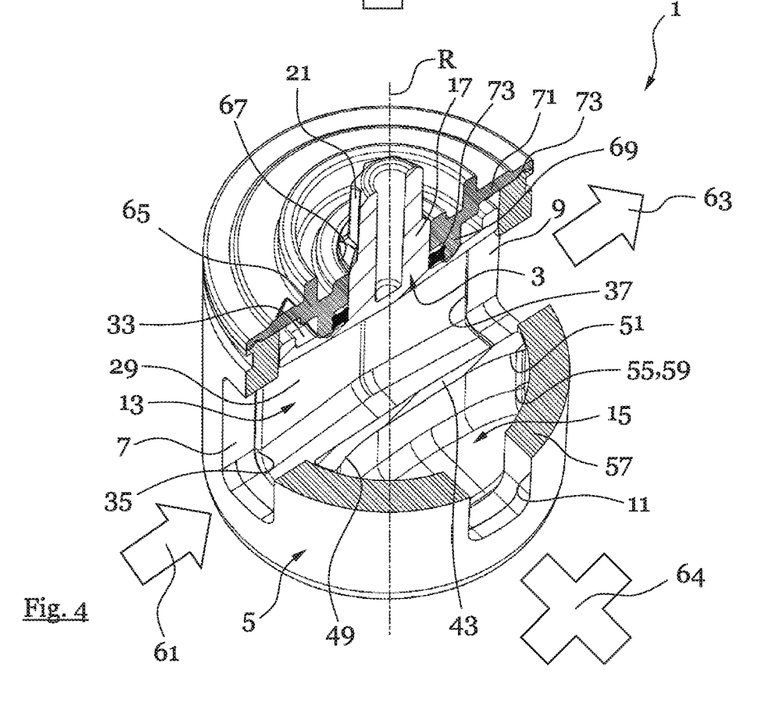
FIG. 4 is a perspective cross-sectional view of the multiport valve according to FIG. 3.
Figure 5:
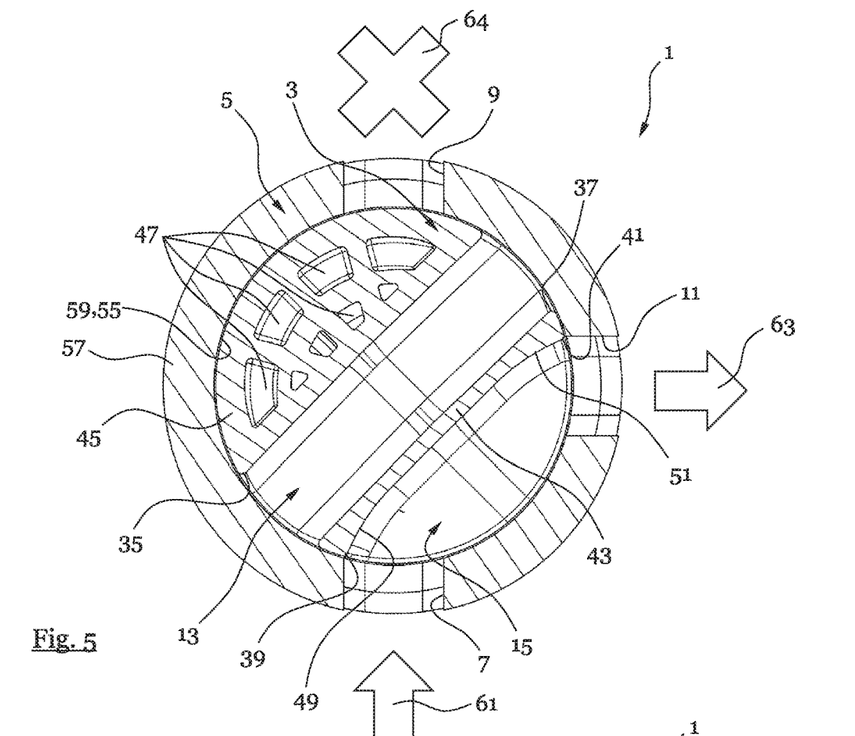
FIG. 5 is a cross-sectional view of a multiport valve according to an embodiment in a further control state.
Figure 6:
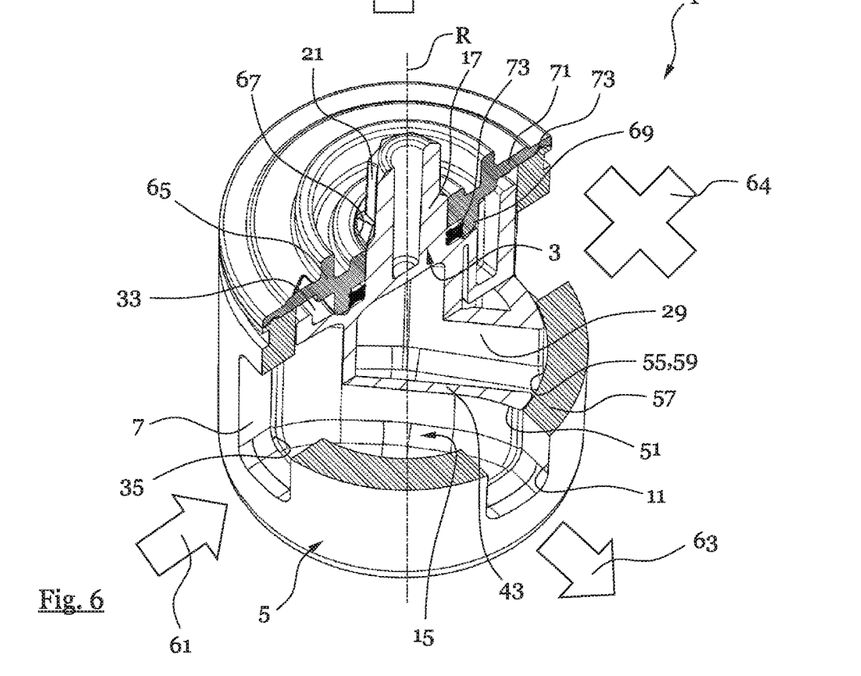
FIG. 6 is a perspective cross-sectional view of the multiport valve according to FIG. 5.

Referring to FIGS. 3 through 6, an exemplary embodiment of a multiport valve 1 according to the embodiments is illustrated in accordance with two control states of the multiport valve 1, wherein FIGS. 3 and 4 show a first control state and FIGS. 5 and 6 show a second control state of multiport valve 1.

As indicated from a combination of FIGS. 3 and 4, the valve housing 5 is formed essentially hollow cylindrically and rotationally shaped. At least on one face side facing to the rotational direction R, the housing 5 is open towards the environment to allow for assembly or introducing of the rotary slide 3 and to an interior housing space 55. In FIG. 3 it is shown that the valve housing 5 has an annular cylindrical housing wall 57 extending circumferentially around the rotary slide 3, being closed and having a constant cross section. On an inwardly facing housing interior wall 59 limiting the interior housing space 55, the valve housing 5 comprises a rotationally shaped valve seat in regard to which the rotationally shaped rotary slide 3 is rotatably mounted. Crosswise towards the rotational direction R, the rotary slide 3 is dimensioned slightly smaller so as to allow for the rotary slide 3 to be inserted into the housing interior space 55 wherein it shall be clear that sealing elements as well as sliding bearing elements can be provided between the exterior circumference of the rotary slide 3 and the valve seat 59 can be provided, on the one hand to enable a low-friction relative rotation of the rotary slide 3 in relation to the valve housing 5, and on the other hand to avoid that fluid flow can come into the intermediate area between the rotary slide 3 and the valve housing 5.

As has previously been mentioned, the rotary slide 3 is configured to connect two fluid connections 7, 9 or 7, 11 fluidly through a fluid channel 13, 15 dependent upon its rotational position in relation to the rotational axis R, so as to enable a fluid flow indicated with arrows in FIGS. 3 through 6 through one fluid channel 13, 15 and to prevent a fluid flow through the further fluid channel 15, 13 and correspondingly through a further fluid connection as is schematically shown with a large X in the figures.

The multiport valve 1 takes a first control state in the position of the rotary slide 3 shown in FIG. 3 or 4. In the first control state, the rotary slide 3 is oriented with regard to the valve housing 5 such that the first fluid channel 13 connects a first pair of fluid connections 7, 9 fluidly with one another so as to lead an entry fluid flow 61 through the rotary slide 3 such that the fluid flow can leave the rotary slide 3 or the valve housing 5 and the fluid connection 9 which then realizes a fluid exit 9 as a fluid exit flow 63. In the design configuration of the rotary slide 3 or the housing 5 it is essential that the throughflow cross section of the fluid connections 7, 9 essentially corresponds to the throughflow cross section of the fluid channel 13. Thereby it is ensured that the smallest possible loss occurs which would decrease the efficiency of the valve 1. The fluid channel 13 is additionally configured such that in the first control stage shown in FIGS. 3 and 4, the fluid flow 61 experiences essentially no deflection and can flow essentially completely rectilinearly through the fluid entry connection 7, the fluid thoroughfare channel 13, and the fluid exit connection 9. Furthermore, it is decisive for the function of the multiport valve 1 that when entering the control state of the multiport valve 1 shown in FIGS. 3 and 4, in which the fluid flow through the fluid channel 13 is enabled, no fluid flow through the further, second fluid channel 15 occurs (reference numeral 64). This is realized firstly by positioning the separation wall 43 for one such that the fluid entry flow 61 entering through the fluid entry connection 7 cannot come into the fluid channel 15 and secondly through the dimensioning and configuration of the separation wall 43 which completely fluidly separates the fluid channels 13, 15 from one another and which engages in a sealing or sliding contact with the valve seat 59 with its front face.

In FIG. 4, a perspective view of the multiport valve 1 according to a first control state according to FIG. 3 is shown, wherein one part of the multiport valve 1 is cut out so as to emphasize the inner structure of the multiport valve. In FIG. 4, a further feature of a multiport valve 1 according to the embodiments is shown, according to which the fluid connections 7, 9, 11 and the fluid channels 13 or 15 overlap with regard to a crosswise direction across in regard to the rotational axis R, in particular in the radial direction. For example, as shown in the figures, the fluid connections 7, 9, 11 and the fluid channels 13, 15 overlap in the crosswise direction essentially completely, wherein one pair of fluid connections 7, 9 and the fluid channel 13 associated with this pair 7, 9 is essentially completely aligned and oriented in the first control state (FIG. 3, FIG. 4). In other words, the fluid connections 7, 9, 11 and the fluid channels 13, 15 are arranged on the same plane in regard to the rotational axis R.

As shown in FIG. 4, the multiport valve 1 can comprise a housing lid 65 which comprises essentially the same outer circumferential dimension as the valve housing 5 in the crosswise or radial direction across with respect to the rotational axis R. The housing lid 65 partially lies on the valve housing 5 and partially on the rotary slide 3. The housing lid 65 is designed in a plate-like manner and comprises in its centre a passage opening 67 for leading the carrier shaft 17 of the rotary slide 3 therethrough. An inner annular edge 69 runs around the passage-bore-opening 67 and protrudes in the rotational direction R from the basic structure 71 of the housing lid 65 such that the same stands on the rotary slide 3. Between the annular edge 69 and the carrier shaft 17, a sealing and/or dampening element 73 is arranged, which can also be formed circumferentially with regard to the rotational axis R. An outer, circumferential bearing section 73 of the housing lid 65 lies two-dimensionally on the cylindrical ring edge 57 of the valve housing 5 and closes for example flush with it crosswise with regard to the radial direction R.

Referring to FIGS. 5, 6, a further, second control state of a multiport valve 1 according to the embodiments is shown. In contrast to the control state according to FIGS. 3, 4, in FIGS. 5, 6, the rotary slide 3 is rotated by 45° with regard to the rotational axis R. This means that for taking a different switching or control state of the multiport valve 1, the rotary slide 3 is turned around the rotational axis R for 45°. In FIGS. 5, 6, the rotary slide 3 provides a fluid connection between one further fluid connection pair, namely the fluid entry connection 7 and the fluid exit connection 11, and does so through the further, second fluid channel 15. In this control state, the first fluid channel 13 is switched blind. This means that no fluid flow is provided or possible through the fluid channel 13 or fluid exit connection 9. The fluid entry flow 61 which reaches the multiport valve 1 through the fluid entry connection 7 shall be guided exclusively or completely through the fluid channel 15, which guides the fluid flow to the fluid exit connection 9, in which the fluid entry flow 63 leaves the valve housing 5 again. It is shown, that the fluid channel 15, due to its structure, achieves a deflection of the fluid flow of 90°. Thereby, the configuration of the fluid channel 15 and additionally the matching of the throughflow cross sections between the fluid channel 15 and the corresponding fluid connections 7, 11, enables a guiding of the fluid flow but with particularly little or without any loss of flow. Through the curved wall sections 49, 51 of the separation wall 43 which are essentially responsible for the deflection of the fluid flow, which are only slightly curved, the fluid flow experiences a continuously small deflection going into the fluid channel 15 and correspondingly out of the fluid channel 15. The corresponding transitions between fluid connection 7 on the housing side and the fluid connection opening 39 on the side of the rotary slide or fluid connection opening 41 on the rotary slide side and the fluid connection 11 on the housing side are configured such that the fluid flow may flow essentially free of edges, protrusions and/or dead volume through the housing 5 and the rotary slide 3. Furthermore, reference is made to the explanations regarding the control state according to FIGS. 3 and 4.

In FIGS. 7 and 8, fluid circuits 100 according to the embodiments are schematically illustrated, wherein a multiport valve 1 included in the fluid circuit 100 is shown in a first control state in FIG. 7 and in a second control state in FIG. 8. Exemplarily, the fluid circuit 100 in FIGS. 7 and 8 is realised as a cooling means circuit 100, having a main channel 109 connecting a motor fluid entry 103 of a motor 105 of a motor vehicle (not shown) and a motor fluid exit 107 of the motor 105, wherein a cooler 111 is integrated in the main channel 109. The cooler 111 is configured to introduce chilled cooling fluid to the motor 105. Furthermore, the cooler means circuit 100 comprises a bypass channel 113 for circumventing the cooler 111. Through the bypass channel 113, cooling fluid coming from the motor 105 can be returned to the motor 105 unchilled, that is without influence of the cooler 111.

As previously mentioned, furthermore, a multiport valve 1 is integrated in the cooling means circuit 100. The multiport valve 1 is configured to provide chilled cooling fluid coming from the cooler 111 to the motor 105 in a first control state, a so called chilling state, and, in a second position or in a second control state, the so called bypass position or bypass state, to return unchilled cooling fluid from the motor 105 to the motor 105.

In FIG. 7, the cooling state of the multiport valve 1 is schematically shown, in which the bypass channel 113 is completely closed and in which the main channel 109 is completely open. In FIG. 1, the bypass position is schematically illustrated, in which the multiport valve 1 is positioned such that the bypass channel is completely released and completely closes the main channel 109. The housing 5 of the multiport valve 1 comprises a fluid connection 7 formed as a motor fluid entry for receiving cooling fluid coming from the motor 105 and a fluid connection 9 realises a motor fluid exit for discharging a cooling fluid to the cooler 111. Furthermore, the housing 5 comprises a fluid connection 11 realised as a motor fluid exit connected or connectable with a motor fluid entry 103 of the motor 105 via the bypass channel 113.

Through the integration of a multiport valve 1 according to the embodiments into a cooling means circuit 100 according to the embodiments, the efficiency of a combustion motor 105 of a motor vehicle can be significantly increased. For example, the operative behaviour of the combustion engine in the cold start phasis can be influenced. For example, by means of the multiport valve 1 in the cooling means circuit 100 of motor vehicles dependent on the cooling fluid temperature and/or ambient temperature, the flow of cooling fluid through the bypass channel 113 or the main channel 109 can be set in order to realise different throughflow scenarios. Thereby, it can be provided that until a certain predetermined temperature, in particular a switching temperature of the cooling fluid and/or of the environment, a cooling fluid flow through the bypass channel 113 is led back to the motor 105, for example during a cold start or a warming up phasis. As soon as the cooling fluid temperature and/or the ambient temperature has reached a predetermined switching temperature, the cooling fluid flow shall be detoured into the main channel 109 for chilling through the chiller 111, before the chilled cooling fluid flow is once more introduced to the motor 105. For controlling or activating the multiport valve 1, known control actuators or drives can be employed, which can be provided with a control rule logic (not shown).

In FIG. 7, in which the first control state of the multiport valve is shown which realises a chilling position of the motor 105, the fluid flow indicated with a continuous arrow reaches the cooler through the fluid channel 13 and the corresponding, associated pair of fluid connections 7, 9 and eventually back to the motor 105 to cool the same. The fluid channel 15 is switched blind or transfers no fluid flow.

In contrast, FIG. 8 shows the second control state which exemplarily shows a bypass position. The fluid flow is completely led back to the motor 105 through the fluid channel 15 and the pair of fluid connections 7, 11 associated with the fluid channel 15, without any chilling being performed by the cooler 111. The main channel 109 is consequently circumvented. In this state the fluid channel 13 is now switched blind so that no fluid flow flows through the fluid channel 13. The respective non-active channel of main channel 109 and bypass channel 113 is illustrated as a dashed line in FIGS. 7, 8. The main channel 109 or bypass channel 113, respectively, which may also be named fluid lines or fluid conduits, are part of a fluid carrying structure 115 of the cooling means circuit 100 responsible for guiding the fluid.

The features disclosed in the proceeding description, the figures and the claims can be relevant for the embodiments either individually as well as in any combination thereof for the realisation of the invention in the different embodiments thereof.

LIST OF REFERENCE NUMERALS 1 multiport valve
3 rotary slide
5 valve housing
7, 9, 11 fluid connection
13, 15 fluid channels
17 shaft
19 basic structure
21 sprocket
23, 25 basis surface
27 axial wall
29 fluid channel wall
31 annular edge
33 basic surface
35, 37, 39, 41 fluid connection opening
43 separation wall
45 wall section
47 hollow space
49, 51 curved wall sections
53 connection wall section
55 housing space
57 housing wall
59 valve seat
61 fluid entry flow
63 fluid exit flow
65 housing lid
67 opening
69 edge
71 basic structure
73 sealing and/or dampening element
100 fluid circuit
103 motor fluid entry
105 motor
107 motor fluid exit
109 main channel
111 cooler
113 bypass channel
115 fluid carrying structure
R rotational axis

We claim:

1. A multiport valve for controlling a fluid flow in a fluid circuit, the multiport valve comprising:
a valve housing having at least three fluid connections; and
a rotary slide for setting the fluid flow arranged in the valve housing, the rotary slide comprising at least two fluid channels and being configured to connect two respective fluid connections fluidly via one fluid channel dependent upon its rotary position in relation to its rotational axis (R), wherein the at least three fluid connections and the at least two fluid channels overlap in relation to a crosswise direction oriented crosswise relative to the rotational axis (R);
wherein the multiport valve has a first control state in which the rotary slide is aligned in relation to the valve housing such that a first fluid channel from the at least two fluid channels connects a first pair of fluid connections from the at least three fluid connections fluidly with one another and a fluid flow through a second fluid channel from the at least two fluid channels is prevented, and has a second control state in which a fluid flow through the first fluid channel is prevented and the second fluid channel connects a second pair of fluid connections from the at least three fluid connections fluidly with one another, further wherein each fluid channel is assigned to exactly one pair of fluid connections.

2. The multiport valve according to claim 1, wherein at least one of the at least three fluid connections is configured as a fluid entry for introducing fluid into the valve housing and at least one of the at least three fluid connections is configured as a fluid exit for dispensing fluid from the valve housing.

3. The multiport valve according to claim 2, wherein the assignment is such that each fluid channel connects exactly one pair of fluid connections fluidly with one another in exactly one rotational position of the rotary slide, so as to allow a fluid flow between the pair of fluid connections and to prevent fluid flow through the second fluid channel.

4. A multiport valve for controlling a fluid flow in a fluid circuit, the multiport valve comprising:
- a valve housing having at least three fluid connections; and
- a rotary slide for setting the fluid flow arranged in the valve housing, the rotary slide comprising at least two fluid channels and being configured to connect two respective fluid connections fluidly via one fluid channel dependent upon its rotary position in relation to its rotational axis (R), wherein the at least three fluid connections and the at least two fluid channels overlap in relation to a crosswise direction oriented crosswise relative to the rotational axis (R);
- wherein the multiport valve has a first control state in which the rotary slide is aligned in relation to the valve housing such that a first fluid channel from the at least two fluid channels connects a first pair of fluid connections from the at least three fluid connections fluidly with one another and a fluid flow through a second fluid channel from the at least two fluid channels is prevented, and has a second control state in which a fluid flow through the first fluid channel is prevented and the second fluid channel connects a second pair of fluid connections from the at least three fluid connections fluidly with one another,
- further wherein the at least two fluid channels are independent from one another and fluidly separated from one another, wherein two respective adjacent ones of the at least two fluid channels are separated and hermetically sealed off from one another by a separation wall oriented across in relation to the rotational axis (R).

5. The multiport valve according to claim 1, wherein an axial extension of the at least three fluid connections and of the at least two fluid channels along the rotational axis (R) of the rotary slide is at least 50% of a total axial extension of the rotary slide.

6. The multiport valve according to claim 1, wherein the valve housing comprises a rotationally shaped valve seat in relation to which the rotary slide is rotatably mounted, wherein the valve housing forms the valve seat or a ring valve seat lies radially between the rotary slide and the valve housing.

7. The multiport valve according to claim 1, wherein at least one of the fluid channels is realized as a thoroughfare channel and connects to a fluid connection opening realized at the outer circumference of the rotary slide and comprises a constant throughflow cross section.

8. A multiport valve for controlling a fluid flow in a fluid circuit, the multiport valve comprising:
- a valve housing having at least three fluid connections; and
- a rotary slide for setting the fluid flow arranged in the valve housing, the rotary slide comprising at least two fluid channels and being configured to connect two respective fluid connections fluidly via one fluid channel dependent upon its rotary position in relation to its rotational axis (R), wherein the at least three fluid connections and the at least two fluid channels overlap in relation to a crosswise direction oriented crosswise relative to the rotational axis (R);
- wherein the multiport valve has a first control state in which the rotary slide is aligned in relation to the valve housing such that a first fluid channel from the at least two fluid channels connects a first pair of fluid connections from the at least three fluid connections fluidly with one another and a fluid flow through a second fluid channel from the at least two fluid channels is prevented, and has a second control state in which a fluid flow through the first fluid channel is prevented and the second fluid channel connects a second pair of fluid connections from the at least three fluid connections fluidly with one another;
- wherein at least one of the fluid channels is realized as a thoroughfare channel and connects to a fluid connection opening realized at the outer circumference of the rotary slide and comprises a constant throughflow cross section, wherein at least one of the fluid channels has a throughflow cross section changing in accordance with the outer contour of the rotary slide, wherein that fluid channel is continuously outwardly open.

9. The multiport valve according to claim 8, wherein the rotary slide performs a rotational movement of less than 90° in relation to the rotational axis (R) when switching between the first control state and the second control state.

10. The multiport valve according to claim 9, wherein a fluid channel of the rotary slide is configured such that the fluid flow is deflected by 90°, wherein the continuously outwardly open at least one further fluid channel comprises a concavely curved inner contour at the respective fluid connection side.

11. The multiport valve according to claim 1, wherein one pair of the fluid connections is arranged aligned with another pair of the fluid connections and one fluid channel is configured such that, when guiding the fluid flow from one fluid connection to another fluid connection, the fluid flow experiences no deflection, wherein in particular the rotary slide has one rotational position in which one pair of fluid connections and the fluid channel associated with this pair are arranged aligned with one another.

12. The multiport valve according to claim 1, wherein a throughflow cross section of the fluid connections corresponds to a throughflow cross section of at least one of the fluid channels and to a throughflow cross section of a pair of fluid connection openings of a fluid channel.

13. The multiport valve according to claim 1, wherein the fluid channels are configured such that the respective fluid channels are matched with the pair of fluid connections associated to a fluid channel such that the fluid flow can pass the pair of fluid connections and the fluid channel associated with this pair free of a flow obstruction, such as free of edges, free of projections and free of dead volume.

14. The multiport valve of claim 1, wherein the multiport valve is disposed in a cooling fluid circuit of a motor vehicle.

15. A fluid circuit comprising:
- a multiport valve according to claim 1; and
- a fluid conduit structure attached to the multiport valve in a fluid-carrying manner.

16. A fluid circuit for introducing or discharging a cooling fluid into or from a motor, comprising:
- a main channel connecting a motor fluid entry and a motor fluid exit in which the main channel and a cooler are integrated together, and through which the cooling fluid can be introduced to the motor;
- a bypass channel for bypassing the cooler; and
- a multiport valve according to claim 4.

17. The fluid circuit of claim 16, wherein the motor comprises a combustion motor or an electric motor of a motor vehicle, further wherein a first control state comprises a cooling position, in which the motor is supplied with the cooling fluid from the cooler via the main channel and in which a stream of the cooling fluid through the bypass channel is prevented, wherein a second state comprises a bypass position, in which the motor is supplied with unchilled cooling fluid via the bypass channel and in which a stream of the cooling fluid through the main channel is prevented.

18. The multiport valve according to claim 8, wherein the rotary slide performs a rotational movement of less than 90° in relation to the rotational axis (R) when switching between the first control state and the second control state, and wherein a fluid channel of the rotary slide is configured such that the fluid flow is deflected by 90°, wherein the continuously outwardly open at least one further fluid channel comprises a concavely curved inner contour at the respective fluid connection side.

19. A fluid circuit for introducing or discharging a cooling fluid into or from a motor, comprising:
    a main channel connecting a motor fluid entry and a motor fluid exit in which the main channel and a cooler are integrated together, and through which the cooling fluid can be introduced to the motor;
    a bypass channel for bypassing the cooler; and
    a multiport valve according to claim 8.

20. The multiport valve according to claim 4, wherein an axial extension of the at least three fluid connections and of the at least two fluid channels along the rotational axis (R) of the rotary slide is at least 50% of a total axial extension of the rotary slide, further wherein the valve housing comprises a rotationally shaped valve seat in relation to which the rotary slide is rotatably mounted, wherein the valve housing forms the valve seat or a ring valve seat lies radially between the rotary slide and the valve housing.

* * * * *